3,062,901
PREPARATION OF 3,3,3-TRIFLUOROPROPENE

John J. Newport III, Lake Jackson, Franciszek Olstowski, Jones Creek, and John D. Watson, Lake Jackson, Tex., assignors to The Dow Chemical Company, Midland, Mich., a corporation of Delaware
No Drawing. Filed Oct. 5, 1959, Ser. No. 844,198
3 Claims. (Cl. 260—653.3)

This invention relates to a method for preparing 3,3,3-trifluoropropene and is more particularly concerned with a non-catalytic, single step process whereby a fluorohalomethane is reacted with ethane to produce 3,3,3-trifluoropropene.

One of the conventional methods of preparing 3,3,3-trifluoropropene involves a multi-step process including the conversion of ethyl trifluoroacetate to trifluoroacetone, reducing the trifluoroacetone to the alcohol, and dehydrating the alcohol to 3,3,3-trifluoropropene. This process is expensive because of the starting materials and the numerous steps involved.

A second method involves the free radical addition of $CF_3I$ to $CH_2=CH_2$ in the presence of a catalyst and then dehydroiodination to yield 3,3,3-trifluoropropene. This process, like the one outlined in the preceding paragraph involves expensive reagents, catalysts and a multi-step procedure, and thus constitutes an expensive procedure for preparing 3,3,3-trifluoropropene.

Still another method involves reacting $CCl_4$ with HBr in the presence of a catalyst to produce $$CCl_3—CH_2—CH_2Br$$

and reacting the $CCl_3—CH_2—CH_2Br$ with hydrogen fluoride to yield 3,3,3-trifluoropropene.

It is an object of our invention to provide a new and improved process for preparing 3,3,3-trifluoropropene. Another object is to provide such a process which does not require a catalyst and which, therefore, avoids the expense and other undesirable features of catalytic processes. A preferred object is to provide a method for producing 3,3,3-trifluoropropene from cheaper starting materials and by a cheaper and more efficient method. Still other objects will appear hereinafter.

These objects are readily accomplished by contacting, at a temperature between about 250° C. and about 700° C., a fluorohalomethane with ethane and, separating 3,3,3-trifluoropropene from the reaction mixture.

The fluorohalomethanes to be employed in accordance with our invention are represented by the formula $CF_3X$, wherein X is a halogen, either chlorine or bromine. The hydrocarbon reactant will be ethane.

The reactant ratio may be varied from 10:1 to 1:10 fluorohalomethane to hydrocarbon, with the preferred reactant ratio of 5:1 fluorohalomethane to hydrocarbon giving good conversions and yields.

The reactor will be heated to temperatures between about 250° C. and 700° C., however, temperatures from about 500 to about 600° C. are preferred. At temperatures materially above 600° C., the significant fluorocarbon produced is vinylidene fluoride.

Contact times, as expressed herein, are based on the time the reactant gases spend in that portion of the reactor that is within 100° C. of the temperature indicated for the operation. In our process, the contact times will be within the range of from about 0.1 second to about 10 seconds. Preferably, a contact time of 1.0 second is employed.

The process is preferably carried out at atmospheric pressures, that is, a pressure of approximately one atmosphere, however, higher and lower variations in the range of 0.5 to 5 atmospheres have little or no effect on the conversions and yields.

The products of the reaction passing from the reactor will usually be scrubbed in caustic solution in order to remove acidic products from the gaseous stream and the trifluoropropene recovered in a conventional manner.

The following example is given to illustrate our invention but is not to be construed as limiting the invention thereto.

Example

The reactor consisted of a nickel tube having an inside diameter of ⅜ of an inch and a length of approximately 12 inches. The reactor was heated to a temperature of 550° C. by a one-half kilowatt tube furnace. Ethane was passed through the tube at a flow rate of 4 grams per hour admixed with a $CF_3Br$ at a flow rate of 20 grams per hour. The estimated contact time of the reactants at the furnace temperature was approximately one second.

The exit gases from the reactor were passed through an aqueous caustic scrubber to trap any acidic products formed. The gases from the scrubber were then trapped in a gas bomb.

The product gases were than analyzed by infra-red techniques and found to contain significant quantities of $CF_3—CH=CH_2$ along with $CF_3H$, unreacted $CF_3Br$ and $C_2H_6$.

In a manner similar to the foregoing $CF_3Cl$ may be substituted for the $CF_3Br$ specifically shown with similar results.

Various modifications may be made in the present invention without departing from the spirit and scope thereof and, we limit ourselves only as defined in the appended claims.

We claim:
1. A process for preparing 3,3,3-trifluoropropene which comprises contacting, at a temperature ranging from about 250° C. to about 700° C., ethane with a compound having the formula $CF_3X$, wherein X is a halogen selected from the group consisting of chlorine and bromine, and separating 3,3,3-trifluoropropene from the reaction mixture.
2. A process for preparing 3,3,3-trifluoropropene which comprises contacting, at a temperature of about 550° C., ethane with $CF_3Br$ and separating 3,3,3-trifluoropropene from the reaction mixture.
3. A process for preparing 3,3,3-trifluoropropene which comprises contacting, at a temperature ranging from about 250° C. to about 700° C., ethane with $CF_3Cl$ at a temperature below 600° C., and separating 3,3,3-trifluoropropene from the reaction mixture.

References Cited in the file of this patent

UNITED STATES PATENTS

| | | |
|---|---|---|
| 2,551,573 | Downing et al. | May 8, 1951 |
| 2,551,639 | Feasley et al. | May 8, 1951 |
| 2,627,529 | Feasley et al. | Feb. 3, 1953 |
| 2,758,138 | Nelson | Aug. 7, 1956 |
| 2,979,539 | Errede et al. | Apr. 11, 1961 |

FOREIGN PATENTS

| | | |
|---|---|---|
| 732,269 | Great Britain | June 22, 1955 |

UNITED STATES PATENT OFFICE
CERTIFICATE OF CORRECTION

Patent No. 3,062,901                      November 6, 1962

John J. Newport III, et al.

It is hereby certified that error appears in the above numbered patent requiring correction and that the said Letters Patent should read as corrected below.

In the Letters Patent (only), columns 5 to 8 of Patent No. 3,062,902 were inadvertently inserted and should be deleted; column 2, line 54, strike out "at a temperature below 600° C.,".

Signed and sealed this 14th day of May 1963.

(SEAL)
Attest:

ERNEST W. SWIDER
Attesting Officer

DAVID L. LADD
Commissioner of Patents